May 21, 1968 J. E. F. MARSHALL 3,384,309
SEPARATION OF METAL FROM RUBBER
Filed Dec. 27, 1965 2 Sheets-Sheet 1
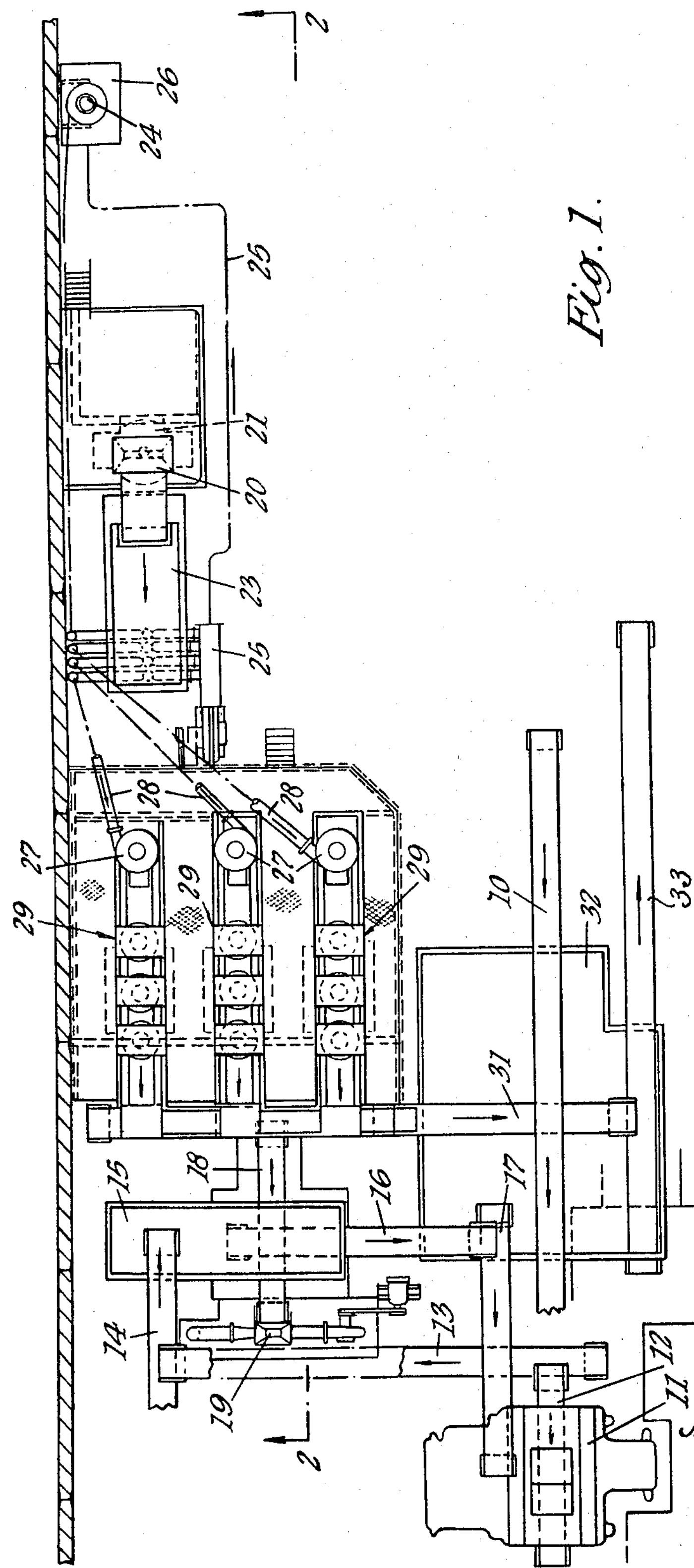
INVENTOR
JAMES E.F. MARSHALL May 21, 1968 J. E. F. MARSHALL 3,384,309
SEPARATION OF METAL FROM RUBBER
Filed Dec. 27, 1965 2 Sheets-Sheet 2
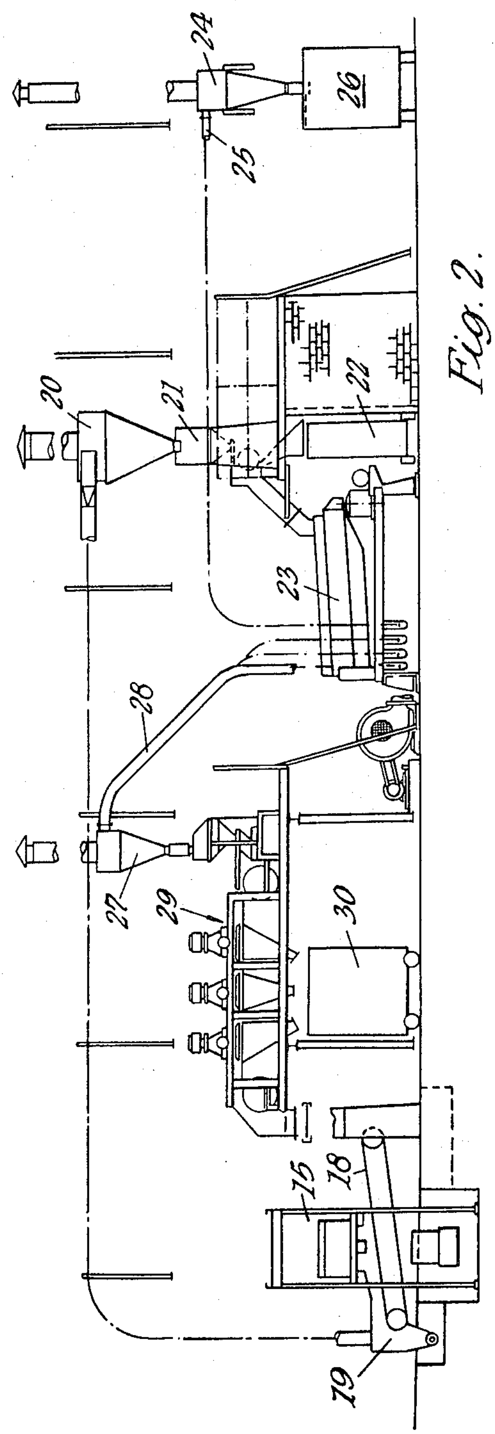
INVENTOR
JAMES E.F. MARSHALL United States Patent Office 3,384,309

Patented May 21, 1968

1

3,384,309

SEPARATION OF METAL FROM RUBBER

James E. F. Marshall, Truro, England, assignor to The North British Rubber Company Limited, Castle Mills, Edinburgh, Scotland, a corporation of Scotland Filed Dec. 27, 1965, Ser. No. 516,647
4 Claims. (Cl. 241—14)

The present invention relates to a process for the separation of metal from rubber or similar compositions and more particularly, to the reclamation of rubber from scrap tires having wire plies.

At the present time scrap rubber tires having textile plies are prepared for reclaiming by being broken down into a crumb. The bead wire may be cut out with its surrounding rubber and textile and discarded before the carcass is broken up into a crumb of a size suitable for the mechanical removal of the textile fibers or chemical removal of the textile fibers during the reclaiming process. In large scale operations the crumbing equipment can be large enough to crush the tire without prior removal of the bead wire.

During the crumbing operation the material is sieved and passed through magnetic separators which remove the broken down bead wire if present and random metal contamination such as nails and the like picked up by the tire during its working life.

This process is not able to produce a satisfactory metal-free crumb when dealing with scrap tires containing plies of wire reinforcement as the wire which is normally finer then bead wire is surrounded by rubber. The normal crumbing operation does not separate the wire from the rubber so that separation of the wire removes a considerable amount of rubber which is attached thereto and furthermore where fine particles underlie coarser particles it is necessary for the magnetic field to be of sufficient strength to pull the finer particles through the coarser particles. Being a finer wire than the bead wire the proportion of small particles is greater than those occurring from a tire only containing textile plies. This fine wire must be excluded as far as possible since its presence in the finally reclaimed rubber would prevent the use thereof in products such as extrusions, fine gauge calendered sheeting, etc.

It is an object of the present invention to provide an improved process for the separation of metal from rubber and similar compositions.

It is a further object of this invention to provide an improved process for the separation of metal wire from rubber from scrap tires having wire plies.

The present invention consists in a process for the separation of metal such as steel wire from rubber or similar compositions including the steps of granulating the rubber into a crumb, classifying the granulated rubber into an oversize crumb which is returned to the granulator and an undersize crumb which is subjected to a low intensity magnetic field which separates wire, and crumb having large wire inclusion, from the remainder of the crumb having small wire inclusion, sizing said remainder to two fractions, subjecting the larger fraction to a high intensity magnetic field which removes the crumb having small wire inclusion and separately discharges the clean, metal-free crumb.

2

In the accompanying drawings:

FIG. 1 is a plan view of a plant for carrying out a process according to the present invention and, FIG. 2 is a side elevation of the plant taken on the line 2—2 of FIG. 1.

In carrying the invention into effect according to one convenient mode, by way of example, the process commences by first debeading the scrap tires and then chopping the tire carcasses into pieces of convenient size which are passed by a conveyor 10 into a cracking plant 11 where the pieces are granulated to approximately ¼ inch size crumb.

The resultant crumb is passed out of the cracking plant 11 on a conveyor 12 from where it is carried by conveyors 13 and 14 into a shaker 15 which classifies the crumb so that any over ¼ inch size is rejected and passed back to the cracking plant 11 by conveyors 16 and 17.

The crumb passed by the screen of the shaker 15 is passed by a conveyor 18 into a conduit 19 from where it is conveyed pneumatically by a cyclone 20 into a magnetic drum separator 21, where it is subjected to a low intensity field of approximately 10,000 gauss, which removes the crumb contaminated by heavy pieces of wire. This last-mentioned crumb is collected in a trolley 22 and returned to the cracking plant 11 for further granulation.

The remaining ¼ inch contaminated crumb is passed over a 40 mesh vibratory screening machine such as a Rotex screen 23, from where the rejected crumb, which is under 40 mesh, is pneumatically conveyed by a cyclone 24 through a conduit 25 into a bin 26 and is then discarded.

The crumb passed by the Rotex screen which is over 40 mesh, is pneumatically conveyed by cyclones 27 through conduits 28 to disc separators 29 which subject the crumb to a high intensity magnetic field of approximately 25,000 gauss. Metallics or crumb having metallic inclusion removed by the separators 29 is collected in trolleys 30 and discarded whilst the clean, metal-free crumb is discharged from the separators 29 onto a conveyor 31 from where it is discharged into a storage bin 32. Conveyor 33 serves to remove the rubber crumb from the storage bin.

Any non-magnetic material present in the crumb after the high intensity magnetic separation, is subjected to known electro-static or pneumatic techniques to separate the textile material from the rubber or destroyed thermally or chemically during the reclaiming of the rubber.

After the removal of non-magnetic material as described above, the rubber crumb is passed through known reclaiming processes followed by straining and refining to produce the final reclaimed rubber.

Having thus described my invention, what I claim and desire to protect by Letters Patent is:

1. A process for the separation of metal from rubber including the steps of granulating the rubber into a crumb, classifying the granulated rubber into an oversize crumb which is returned to the granulator and an undersize crumb which is subjected to a low intensity magnetic field which separates wire, and crumb having large wire inclusion, from the remainder of the crumb having small wire inclusion, sizing said remainder to two fractions, subjecting the larger fraction to a high intensity magnetic field which removes the crumb having small wire inclusion and discharging the clean, metal-free crumb.

2. A process as claimed in claim 1, wherein the low intensity magnetic field is approximately 10,000 gauss.

3. A process as claimed in claim 1, the high intensity magnetic field is approximately 25,000 gauss.

4. A process for the separation of metal from rubber including the steps of granulating the rubber into a crumb, classifying the granulated rubber into an oversize crumb which is returned to the granulator and an undersize crumb which is subjected to a low intensity magnetic field of approximately 10,000 gauss which separates metal and crumb having large wire inclusion from the remainder of the crumb, sizing said remainder into two fractions, subjecting the fraction containing the larger particles to a high intensity magnetic field of approximately 25,000 gauss to remove crumb having small wire inclusion and discharging the clean metal-free crumb.

References Cited

UNITED STATES PATENTS

| | | | |
|---|---|---|---|
| 2,136,099 | 11/1938 | Buxbaum | 241—14 |
| 2,471,043 | 5/1949 | Schenck | 241—14 |
| 2,728,454 | 12/1955 | Heckett. | |
| 2,990,124 | 6/1961 | Cavanagh et al. | 241—24 |
| 3,086,718 | 4/1963 | Lukas | 241—24 |

WILLIAM W. DYER, Jr., *Primary Examiner.*

F. T. YOST, *Assistant Examiner.*